United States Patent [19]

Dzugan et al.

[11] Patent Number: 5,071,054
[45] Date of Patent: Dec. 10, 1991

[54] FABRICATION OF CAST ARTICLES FROM HIGH MELTING TEMPERATURE SUPERALLOY COMPOSITIONS

[75] Inventors: Robert Dzugan; Stephen J. Ferrigno; William R. Young, all of Cincinnati, Ohio; Marc J. Froning, Tolland, Conn.

[73] Assignee: General Electric Company, Cincinnati, Ohio

[21] Appl. No.: 629,856

[22] Filed: Dec. 18, 1990

[51] Int. Cl.$^5$ .......................... B23P 6/04; B23K 1/04
[52] U.S. Cl. .................................... 228/119; 29/889.1
[58] Field of Search ............ 29/527.6, 888.021, 889.1; 228/119

[56] References Cited

U.S. PATENT DOCUMENTS

| | | | |
|---|---|---|---|
| 3,758,347 | 9/1973 | Stalker | 148/4 |
| 4,285,459 | 8/1981 | Baladjanian et al. | 228/119 |
| 4,381,944 | 5/1983 | Smith et al. | 228/119 X |
| 4,614,296 | 9/1986 | Lesgourgues | 228/119 X |
| 4,705,203 | 11/1987 | McComas et al. | 228/119 |
| 4,726,101 | 2/1988 | Draghi et al. | 29/889.1 |
| 4,842,183 | 6/1989 | Antony et al. | 228/119 |

Primary Examiner—Kenneth J. Ramsey
Attorney, Agent, or Firm—Jerome C. Squillaro; Carmen Santa Maria

[57] ABSTRACT

A superalloy article is fabricated by casting a high melting temperature superalloy composition and then refurbishing the primary defects that are found in the surface of the cast piece. The article is refurbished by excising the primary defects and a surrounding portion of metal by grinding, filling the excised volume with metal of the same composition as the cast article by welding or a similar technique, smoothing the surface around any resulting filler metal defects, and applying a cladding powder to the surface from which the filler metal defects are removed. The cladding powder is applied by painting a binder onto the surface and then dusting cladding powder onto the binder before it has dried. The cladding powder is a mixture of particles of a high melting temperature superalloy and particles of a lower melting temperature metal. The article is heated to a preselected temperature, depending on the alloy, to melt and subsequently solidify the cladding powder. Finally, the article is hot isostatically pressed to achieve final closure of surface defects.

17 Claims, 2 Drawing Sheets

FABRICATION OF CAST ARTICLES FROM HIGH MELTING TEMPERATURE SUPERALLOY COMPOSITIONS

BACKGROUND OF THE INVENTION

This invention relates to the fabrication of superalloy articles, and, more particularly, to the preparation of cast superalloy articles from high melting temperature superalloy compositions.

Some of the most demanding applications for materials are found in aircraft gas turbine engines. The materials used in such engines must withstand high temperatures and stresses in adverse environments over long periods of time, and through many cycles of startup and shutdown. The performance objectives of the structures must be met with materials that are as light in weight as possible, because each extra pound of weight reduces the amount of payload that the aircraft can carry. Finally, the structures must be fabricated at as low a cost as possible, to maintain a low overall cost for the engine.

In the gas turbine or jet engine, air is drawn into the front of the engine and compressed by a series of compressor blades. The compressed air is mixed with fuel, and the mixture is ignited. The expanding combustion products turn a turbine that drives the compressor, and then expand out the rear of the engine to cause the engine to move forward. The principles of thermodynamics dictate that the temperature of the combustion as should be as high as possible to attain the highest possible performance and efficiency, but the available materials and construction techniques limit the temperatures at which the engine can operate. Thus, the development of efficient, powerful aircraft engines is reflected in a continuing effort to identify improved materials and methods of construction for the engines, which permit ever-higher operating temperatures.

The modern axial flow jet engine is generally tubular in shape, with the air drawn in the front end of the tube and the combustion gases expanded out the back end of the tube. The compressor and turbine are mounted on a rotating shaft that runs along the center of the engine, and the annular combustion chamber is disposed around the shaft. The engine must have the structural strength and rigidity to hold the operating components together and to maintain the rotating shaft in precise alignment so that the compressor and turbine can function properly. The structure must also resist the adverse effects of the high temperatures encountered in the gas flow path in the rear portions of the engine.

The conventional approach for manufacturing the portion of the structure of the engine subjected to high temperature is to fabricate the individual pieces of the load-bearing framework from a castable nickel-based or cobalt-based superalloy. A liner, generally made from a wrought superalloy, is placed between the cast frame structure and the hot combustion gas to resist the heat. The liner does not bear a substantial part of the structural loadings, but is present to protect the load-bearing structure from temperatures that might cause it to melt or degrade rapidly.

This type of frame construction results from the inability of readily castable superalloys to withstand the high temperatures of the combustion gas. Some superalloys are readily fabricated by melting and casting, while others can only be fabricated by this approach with great difficulty, if at all, because of the defects formed in components made of such alloys. This second class of difficult-to-cast superalloys generally has higher operating temperature capabilities than the readily castable alloys, and it would be desirable to manufacture the frame components from the high melting temperature, difficult-to-cast superalloys, hereinafter also referred to as non-castable alloy or non-castable superalloys. Because these non-castable alloys often are also difficult to weld, even welded structural pieces made from these materials have not been practical in the past. The conventional approach has therefore required the separation of the load-bearing and the heat-resisting functions, and the provision of a separate part to accomplish each function. The separate parts add to the weight and complexity of the engine.

There is a need for an approach for improving the fabrication of aircraft jet engines to reduce their weight while retaining their high-temperature performance. The present invention fulfills this need, and further provides related advantages.

SUMMARY OF THE INVENTION

The present invention provides an approach for fabricating aircraft jet engines that reduces the weight of the engine by permitting the structural load-bearing components to withstand higher temperatures than heretofore possible. High melting temperature, difficult-to-cast superalloys are used to fabricate structures by casting, obviating the need for a liner or other form of protection against the hot gas temperatures.

In accordance with the invention, a process for preparing a cast superalloy article from a high melting temperature, difficult-to-cast superalloy comprises the steps of casting an article from a high melting temperature, difficult-to-cast superalloy; identifying and characterizing primary defects in the cast article; excising the primary defects and a portion of metal around each defect to create excised volume at the surface of the article; filling the excised volume with a filler metal; smoothing filler metal defects and removing oxide at the surface of the filler metal; applying a mixture of a binder and a cladding powder to the surface of the filler metal; heat treating the article to remove the binder, and to melt and solidify the cladding powder; and hot isostatically pressing the article.

It is common in the art to draw a distinction between "castable" and "difficult-to-cast" superalloys, and that distinction is followed here. Those Skilled in the art recognize that the "castable" alloys can be cast into large, complex structural shapes with acceptably low incidence of casting defects such as hot tearing or shrinkage. In "difficult-to-cast" alloys, the incidence of such surface-connected and subsurface casting defects is so frequent and so severe that the alloys are generally excluded from consideration for large structural castings, although such alloys can be readily cast into small articles such as gas turbine engine blades. Because of the severity of defects in large, complex, structural shapes of such alloy castings, these difficult-to-cast alloys, although capable of being cast as small articles, are frequently referred to as "non-castable" alloys. Thus, the term "non-castable" alloys is used herein to refer to such difficult-to-cast alloys.

No compositional definition of castable and non-castable superalloys is as yet possible. Instead, the two classes are distinguished by their functional performance, as described. A further distinction can be drawn from the ease with which castings having such defects can be repaired or refurbished to render them acceptable for intended service, such as by weld repair or hot isostatic pressing (HIP). Non-castable alloys are, as a rule, difficult or impossible to repair or refurbish by a conventional fusion welding process.

Some characteristics of a nickel-based superalloy which would tend to indicate that it is non-castable are a heavy alloy content, with an extended temperature range in which the alloy is partially liquid and partially solid; gamma-prime precipitation hardening through the presence of a relatively large volume fraction of the gamma prime phase upon heat treatment; poor weldability; and good retention of strength to temperatures above about 1500° F. Such alloys are typically prone to hot tearing during casting and to cracking during weld repair, and they are classified as non-castable because they cannot be used to fabricate large structural components by conventional techniques. Some examples of non-castable alloys include RENE' 108, RENE' 77, MAR-M-509, RENE' 125, B-1900, B-1900+Hf, MAR-M-246, Inconel 100, GTD-111, Waspaloy, Inconel 713, Inconel 738, Inconel 792, Inconel 939, and U-500. Turbine blade alloys such as RENE' 80 or MAR-M-247 are classified as non-castable for structural purposes, even though they are routinely cast into small turbine blades. Inconel 718, which is widely used for the production of large structural castings for gas turbine engines, is an example of an alloy which would be classified as castable.

In the method of the invention, an article such as a structural load-bearing component of an aircraft jet engine is cast from a non-castable superalloy composition. The superalloy is melted and cast into a mold that produces the desired shape. Without further treatment, such an article would be unusable as a structural component in an engine due to a large number of surface-connected and subsurface defects, termed "primary defects" herein, that are found in the article.

One particular form of primary defect that is especially detrimental in such structural components is a crack-like opening called a hot tear. Hot tears typically occur when a mushy-freezing alloy is cast under conditions where there is a substantial restraint against uniform shrinkage caused by the mold or the configuration of the article itself. The reduction of temperature during solidification causes sufficient thermal shrinkage and thermal stresses that the partially liquid casting is unable to support the thermal stresses, thereby tearing the casting. The greater the restrained distance over which the thermal stresses are developed, the greater is the likelihood of hot tearing.

In the present approach the cast article is repaired or refurbished by removing or excising the primary defect and a region around the defect, as by grinding it away. Then the volume where metal had been removed is filled by a filler alloy, preferably having substantially the same composition as that used in the remainder of the article, by a process such as welding. Because the filler alloy has substantially the same composition as the base metal of the article, it is also subject to formation of defects, termed herein "filler defects". However, these filler defects tend to be smaller and less severe than the primary defects found in the as-cast article, and can be more readily repaired.

The filler defects are smoothed, as by surface grinding. A cladding coating is applied to the surface of the filler region, and typically overlaps the adjacent regions. A binder material made of a flowable organic composition is applied to the region to be treated by brushing, spraying, or similar treatment. The binder preferably contains an acrylic resin and a volatile solvent for the resin, such as a ketone or an ether. The binder is chosen to be completely removable during a subsequent heat treatment. The solvent evaporates after application, so that the binder remains tacky to the touch for a period of time prior to complete drying. A wide variety of compatible resin binders and solvents are operable.

A cladding powder is dusted onto the surface of the tacky binder, whereupon it adheres to form a cladding layer. Other processes such as fluidized beds may be used to apply the cladding powder to the surface. The process of applying a binder and then dusting on the cladding powder may be repeated several times, to build up a cladding coating of the desired thickness. A typical thickness of the cladding coating is on the order of 0.004 inches. The cladding powder is preferably chosen to include a blend of high melting temperature particles and low melting temperature particles, the high melting temperature component selected from a non-castable superalloy having substantially the same composition as the article, while the low melting component is a second superalloy material.

After the desired thickness of the cladding powder is built up on the surface of the article, it is heat treated, preferably in a vacuum, at a temperature sufficiently high to volatilize or decompose the binder and melt the low-temperature component of the cladding powder. Upon melting, the low-temperature component acts as a melting point depressant for both the high melting temperature component of the cladding powder and the non-castable alloy article as it flows or diffuses into both. The melted low temperature alloy dissolves elements from the other particles and from the article substrate, as interdiffusion occurs and as the melted alloy flows by capillarity into any remaining defects in the article surface. Preferably, the low temperature alloy dissolves a sufficient amount of these elements so that isothermal solidification at the heat treatment temperature occurs. Alternatively, the temperature is reduced slightly so that the metal solidifies substantially isothermally.

Although the added material has been termed a cladding, in the final treated article there is little, if any, evidence of the presence of a separate material composition. The interdiffusion of the superalloys and flow of metal into remaining defects substantially incorporates the small amount of the low temperature superalloy into the non-castable superalloy filler and article. The final article has refurbished or repaired portions which are therefore substantially of the composition of the non-castable superalloy, except for a small amount of the low-melting component, but does not have the primary defects that were present in the as-cast article, or the filler defects that were produced and then removed during the repair process. That the final article has substantially the composition of the non-castable superalloy is important, as a key objective of the technology of the invention is to produce an article from a non-castable superalloy having improved properties as compared with castable superalloys.

Finally, the article is preferably hot isostatically pressed to remove any remaining subsurface defects and consolidate the surface repair or refurbishment. The hot isostatic pressing step is known in the art as a final densification procedure and also serves to heal defects found deep within the article.

More generally, a process for preparing a cast superalloy article from a non-castable alloy comprises the steps of casting a superalloy article from a non-castable high-melting temperature superalloy, the article having a primary surface defect or defects therein; and repairing the article by excising each primary defect and a region around it, filling the excised volume with a high-melting temperature superalloy of substantially the same composition as the article, recognizing that there may be filler metal defects at the surface of the filled volume, smoothing any filler metal defects, and sealing the surface of the filler metal with a cladding having a low-melting temperature metal component that diffuses into the surface of the filler metal during heat treatment or flows into surface filler metal defects by capillarity after melting during heat treatment. Preferably, the entire article is then hot isostatically pressed.

Thus, the present approach provides an important advance in the art of superalloy structural castings. The load-bearing components are fabricated from alloys having superior capability for operation at elevated temperatures, thereby avoiding the need for separate protective pieces such as liners in some instances. The weight of the engine is reduced as a result. Other features and advantages of the invention will be apparent from the following more detailed description of the preferred embodiment, taken in conjunction with the accompanying drawing, which illustrate, by way of example, the principles of the invention.

DETAILED DESCRIPTION OF THE PREFERRED EMBODIMENT

In accordance with the invention, a process for preparing a cast superalloy article from a non-castable superalloy that exhibits unacceptably large casting defects upon solidification comprises the steps of casting an article from a non-castable superalloy; identifying a primary defect at the surface of the cast article; excising the primary defect and a portion of metal around the defect to create an excised volume at the surface of the article; filling the excised volume with a filler metal having substantially the same composition as the non-castable superalloy from which the article is cast; smoothing filler metal defects and removing oxide at the surface of the filler metal; applying a mixture of a binder and a cladding powder to the surface of the filler metal, the cladding powder typically being a mixture of powder particles of substantially the composition of the non-castable high temperature superalloy article and a lower melting temperature superalloy which wets the non-castable superalloy; heat treating the article to remove the binder, and to melt the powder and solidify the resulting alloy by isothermal solidification; and hot isostatically pressing the article.

As a group, the non-castable superalloys have the ability to retain their strengths and other desirable properties to higher temperatures than the castable superalloys (although some specific exceptions may exist). The advantages to be gained from using the non-castable superalloys in structural, load-bearing components have not been realized because of the defects present in the cast structures.

Figure 1:
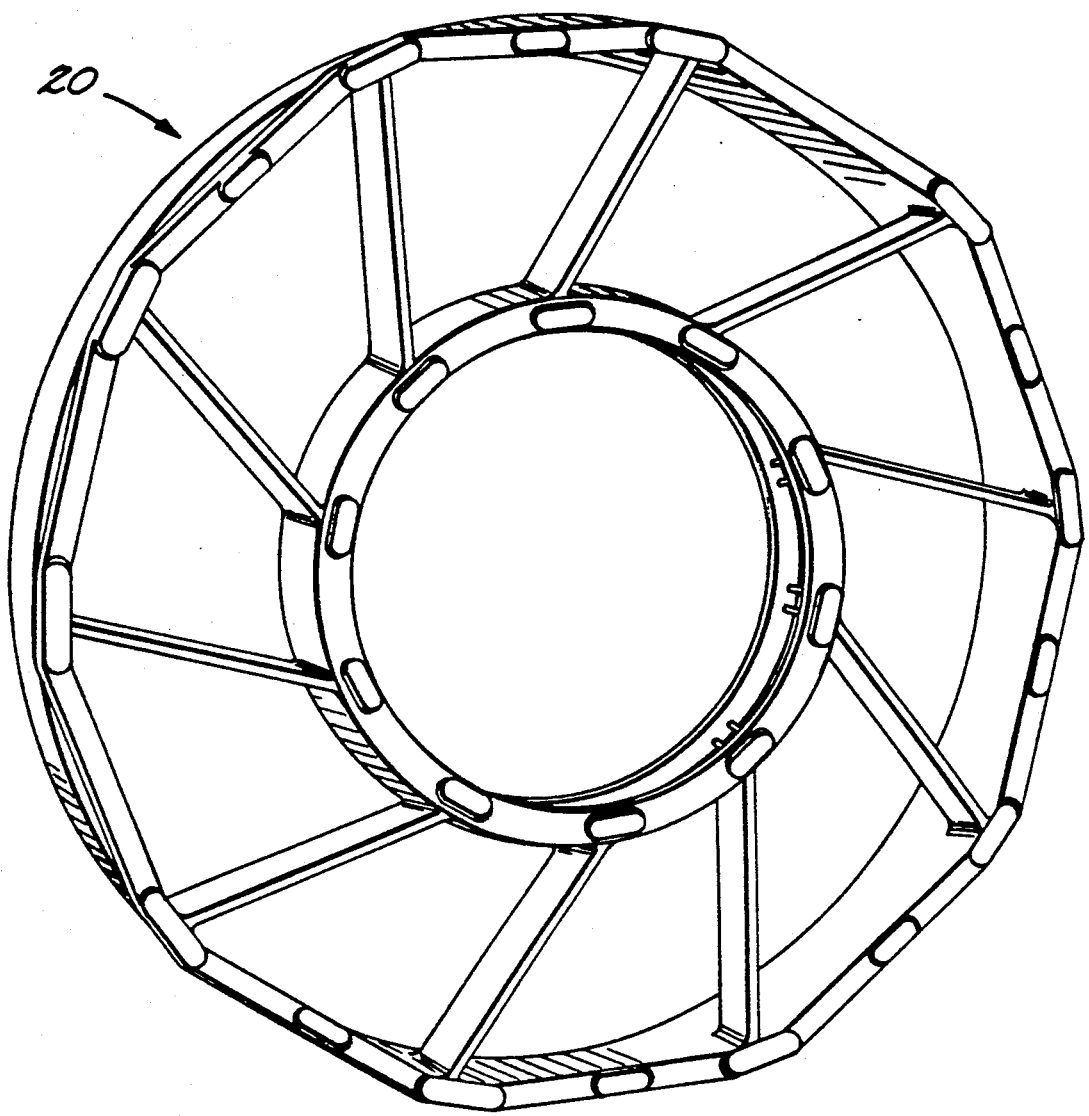
FIG. 1 is a perspective view of an article of the type that can be fabricated by the approach of the invention.

A typical article 20 that can be fabricated using the present invention is an engine frame such as shown in FIG. 1. The basic structure of the article 20 is prepared by investment casting as a single piece from a non-castable nickel-based superalloy.

Figure 2:
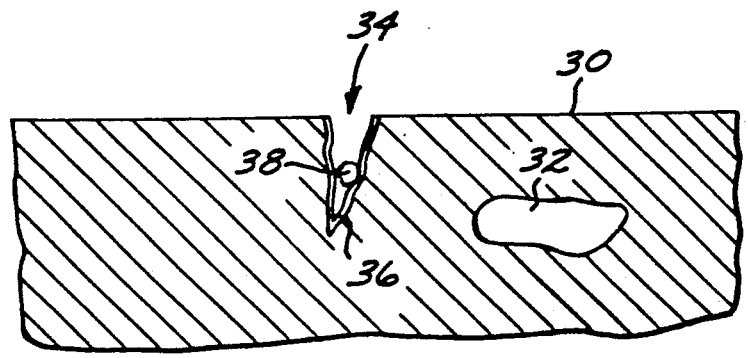
FIG. 2 is an enlarged sectional view of the surface of an article such that of FIG. 1, after casting.

When the article 20 is conventionally cast from a non-castable alloy, it contains numerous defects of the types illustrated in FIG. 2, which is an enlarged sectional view of the article 20 near its surface 30. An interior defect 32 is entirely within the body of the article 20, and has no connection to the surface 30. This type of interior defect 32 can be removed by heating the article 32 to elevated temperature and simultaneously pressing upon it with uniaxial or, preferably, isopiestic pressure, in a process termed hot isostatic pressing. The pressing causes the article 20 to shrink slightly in dimension, forcing the sides of the interior defect 32 together until they bond together under pressure. The interior defect 32 is thereby removed, with only very slight evidence that it existed. Hot isostatic pressing is the final step of the present approach, and any interior defects 32 are closed and welded shut during this step. Hot isostatic pressing has been known previously to heal this type of interior defect; see for example U.S. Pat. No. 3,758,347, whose disclosure is incorporated by reference.

The article 20 also contains defects that are connected to the surface of the article, illustrated here as the primary defect 34. The primary defect 34 has an oxidized surface as indicated by an oxide layer 36, and may contain other contaminants 38 such as dirt within the interior of the primary defect volume. When the article 20 is hot isostatically pressed to remove the interior defects 32, the primary (surface-connected) defects 34 will not be removed. The pressurizing gas readily enters such surface-connected defects and equalizes the pressure thereby preventing closure. The oxidation layer 36 and the contaminants 38 remain in the primary defect 34.

Figure 3:
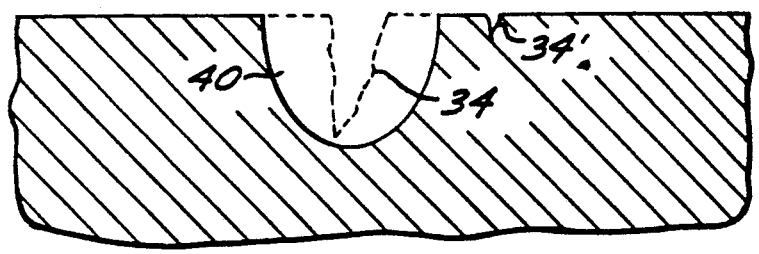
FIG. 3 is an enlarged sectional view of the same region as FIG. 2 after excision of the primary defect, which is shown in phantom lines.

However, the present process allows removal of surface-connected defects, such as the primary defect 34 which is excised, along with a portion of metal 40 typically containing oxides and contaminants surrounding the primary defect 34, as illustrated in FIG. 3. In this figure, the location of the previously existing primary defect 34 is indicated in phantom lines, by way of illustrating that the excised portion 40 is larger in extent that the primary defect 34. Consequently, all of the oxidation layer 36 and the contaminants 38 associated with the primary defect 34 are also removed. Excision can be accomplished by any convenient process, such as grinding for larger primary defects 34 or chemical milling for smaller primary defects 34.

Figure 4:
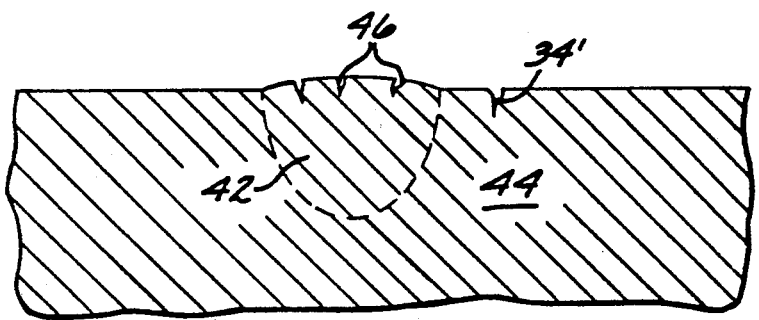
FIG. 4 is an enlarged sectional view of the same region as FIG. 3, after a filler metal has been provided.
Figure 5:
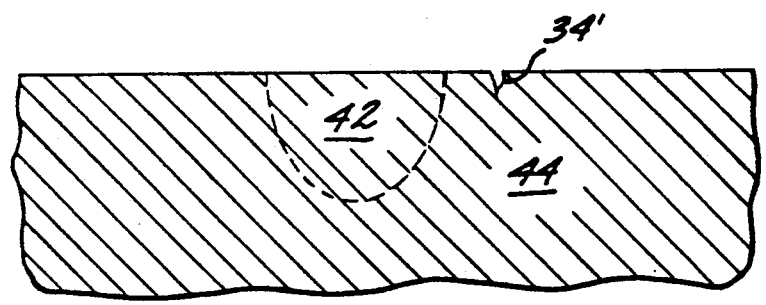
FIG. 5 is an enlarged sectional view of the same region as FIG. 4, after smoothing of the filler metal defects.

The volume previously occupied by the removed portion of metal 40 is filled with a filler metal 42, see FIG. 4. The filler metal is preferably substantially the same alloy as is used to cast the article 20, that is, the filler metal has substantially the same composition as the non-castable superalloy. Selection of the filler metal 42 having substantially the same composition as the balance of the article 20 ensures that the final article will have substantially the same composition throughout, provides compatibility with the article 20, and avoids problems such as composition-induced corrosion cells and pits that might otherwise result during service. The preferred approach to providing the filler metal 42 is welding in vacuum or inert atmosphere. As used herein, the term "welding" means supplying a volume of metal in the molten state while partially melting the margins of the region into which the metal is placed. That is, heat can be applied to partially melt the article 20 in the region of the interface between the filler metal 42 and an unremoved portion 44 of the article 20. This melting ensures a good bond between the filler metal 42 and the unremoved portion 44. In this sense the filler metal 42 is joined to the unremoved portion 44 of the article 20. The filler deposit is indicated in FIG. 5 for purposes of illustration, it is in fact difficult to discern where the filler metal ends and the unexcised portion of the article begins.

To further seal the surface of the article against surface damage and defects, a cladding procedure is followed. Before the procedure is initiated, the surface to be treated, including the surface overlying the filler metal 42, is carefully cleaned by wiping, steam cleaning, vapor degreasing, or other technique to ensure that there is no oil, grease, dirt, or other contaminant on the surface 30.

Figure 6:
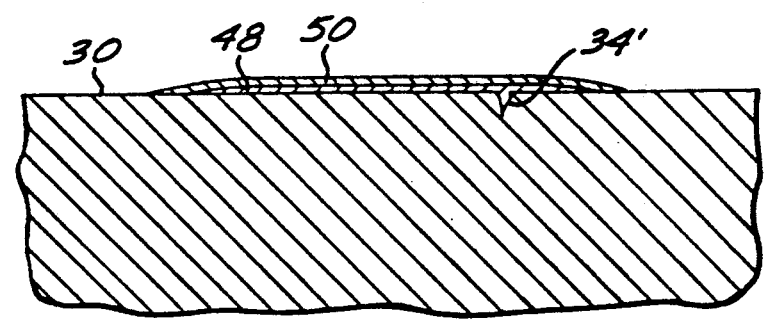
FIG. 6 is an enlarged sectional view of the same region as FIG. 5, after adding a layer of binder and cladding powder.

As illustrated in FIG. 6, a liquid binder is applied to the surface 30, as by brushing, spraying, or other technique to form a binder layer 48. The binder is preferably an acrylic resin based upon methyl methacrylate copolymer, dissolved in a volatile solvent such as diethylene glycol monobutyl ether. A mixture of 1 part by volume of resin to three parts by volume of solvent has been found effective. Although an acrylic resin binder and a diethylene glycol monobutyl ether solvent are preferred, a wide range of compatible resin binders and solvents are commercially available and operable. Any resin binder which adheres to surface 30, and any compatible solvent which slowly evaporates is acceptable. With the passage of a few minutes, the layer 48 becomes tacky to the touch.

A cladding powder is dusted onto the binder layer 48 while the binder layer 48 is still tacky to the touch. Some of the cladding powder sticks to the binder layer 48 to form a cladding powder layer 50, see FIG. 6. The procedure of applying a binder layer 48 can be repeated over the layer 50, and the application of the cladding powder repeated several times until a multilayer mass of cladding powder and binder is built up to a desired thickness. In a typical situation, the layer that is developed is about 0.004 inches thick.

The cladding powder is preferably selected to have at least two different components or types of particles therein. One type is particles preferably having substantially the same composition as the cast article 20. A second type is particles having a superalloy composition that melts at a lower temperature than the first type, wets the particles of the first type, and wets the non-castable material of the article 20. A large difference between the melting temperature of the two particle types contributes to the integrity of the final article, and such a large difference in melting temperature is preferred. It is further preferred that the powder size of each type of particle be in the $-120/+325$ range. Satisfactory results have been obtained where the cladding powder contains between about 40 and about 70, most preferably 50, percent of the first type of particles by weight.

Some particular combinations of the two types of particles in the cladding powder, together with the non-castable alloy of the article, are presented in the following table. The ratio of the High-melting component to the Low-melting component is 50:50 by weight in each preferred case.

TABLE I

| "Non-Castable" Alloy of article | High-melting Component "A" | Low-melting Component "B" | Ratio "A":"B" (wt %) |
|---|---|---|---|
| RENE' 80 | RENE' 80 | D-15 | 50:50 |
| RENE' 77 | IN-718 | IN-718B | 50:50 |
| RENE' 108 | RENE' 108 | D-15 | 50:50 |
| RENE' 220C | RENE' 220C | AMS-4777 | 50:50 |
| MAR M-509 | IN-718 | IN-718B | 50:50 |

The compositions of the alloys discussed in Table I are presented in Table II for reference purposes in approximate weight percent.

TABLE II

|  | IN-718 | IN-718B | R-80 | T-77 | R-108 | R-220c | MAR-M-509 | AMS 4777 | D-15 |
|---|---|---|---|---|---|---|---|---|---|
| Cr | 19 | 18.5 | 14 | 14.6 | 8.35 | 19 | 22.5 | 7 | 15.3 |
| Mo | 3 | 3 | 4 | 4.2 | 0.5 | 3.2 |  |  |  |
| Ti | 1 | 0.9 | 5 | 3.35 | 0.75 | 1 |  |  |  |
| Al | 0.5 | 0.5 | 3 | 4.2 | 5.5 | 0.5 |  |  | 3.3 |
| B | 0.006 | 2.3 | 0.015 | 0.016 | 0.015 |  |  | 3.1 | 2.3 |
| Nb |  |  |  |  |  | 5.25 |  |  |  |
| Ta |  |  |  |  | 2 | 3.25 | 3.5 |  | 3.4 |
| Nb + Ta | 5.1 | 5.0 |  |  |  |  |  |  |  |
| Si |  |  |  |  |  |  |  | 4.5 |  |
| C |  |  |  |  |  |  | 0.6 |  |  |
| W |  |  | 4 |  | 9.5 |  | 7 |  |  |
| Hf |  |  |  |  | 1.5 |  |  |  |  |
| Zr |  |  |  |  | 0.01 |  | 0.5 |  |  |
| Fe | Bal. | 18 |  |  |  |  |  | 3.0 |  |
| Co |  |  | 9.5 | 15 | 9.5 |  | Bal. | 1 | 10.3 |
| Ni | 52.5 | Bal. | Bal. | Bal. | Bal. | Bal. | 10 | Bal. | Bal. |

Figure 7:
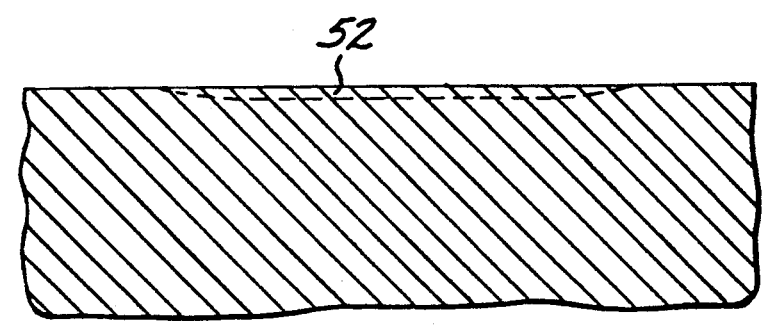
FIG. 7 is an enlarged sectional view of the same region as FIG. 6, after heat treating the article.

After the layers 48 and 50 are applied, the article 30 is heat treated, preferably in vacuum, at a temperature sufficiently high to melt the lower melting temperature particles, but not necessarily melt the first or higher melting temperature particles. The liquid phase is initially of substantially the composition of the second type of particles, but rapidly changes as amounts of the first type of particles and the base metal of the article are dissolved into the liquid phase. An interdiffused layer 52 is formed, see FIG. 7, with the liquid phase tending to diffuse into the surface layers 30 or flow by capillarity into surface defects of the article 20. In most instances, the interdiffused layer 52 solidifies isothermally as an increasing amount of solute enters the liquid phase thus causing elevation of the solidus/liquidus temperature. Alternatively, the heat treatment temperature may be lowered slightly during the operation or step to effect solidification.

The interdiffused layer 52 helps to seal the surface 30 against the effects of very small defects that might have remained from the removal of the filler metal defects 46. In fact, the interdiffused layer 52 is very thin, on the order of 0.004 inch, and has a composition very similar to that of the base metal of the non-castable alloy that forms the bulk of the article 20 as a result of the interdiffusion treatment. Additionally, some of the cladding alloy, after melting, may flow into at least a portion of the filler metal defects by capillarity. To a first approximation, the composition of the article 20 is the same as the non-castable alloy throughout.

The interdiffused layer 52 typically extends beyond the region of the major primary defect 34 to adjacent small primary defects 34' that may be at the surface but are not large enough to warrant separate weld repair procedures. The layer 52 bridges over such defects 34', in the manner described in U.S. Pat. No. 3,758,347. However, this incidental effect of the layer 52 is to be distinguished from the repair procedure for the major primary defects 34 as just described. The hot isostatic pressing operation closes these small defects. The interdiffused layer 52 plays the important role of encapsulating the casting so that the hot isostatic pressing operation can close defects that are otherwise surface connected. Without the cladding, entry of the gas into the surface-connected defects prevents the closure or healing of the defects.

The article 20 is subjected to a hot isostatic pressing treatment at a temperature sufficiently high that interior defects 32 are removed The HIP temperature is at least about 25° F. below the cladding temperature. For example, in the case of a typical non-castable superalloy, the hot isostatic pressing is performed at a temperature of about 2200° F and a pressure of about 15,000 pounds per square inch.

The approach of the present invention provides an important advance in the art of fabricating articles for high temperature use. Although the present invention has been described in connection with specific examples and embodiments, it will be understood by those skilled in the arts involved, that the present invention is capable of modification without departing from its spirit and scope as represented by the appended claims.

What is claimed is:

1. A process for preparing a high-melting temperature superalloy article from a non-castable high-melting temperature superalloy, comprising the steps of:
   casting an article from a non-castable superalloy;
   identifying a primary defect in the superalloy article;
   excising the primary defect and a portion of metal around the defect to create an excised volume at the surface of the article;
   filling the excised volume with a filler metal;
   smoothing filler metal defects and removing oxide at the surface of the filler metal;
   applying a mixture of a binder and a cladding powder to the surface of the filler metal;
   heat treating the article to remove the binder, and to melt and solidify the cladding powder; and
   hot isostatically pressing the article.

2. The process of claim 1, wherein the non-castable superalloy is selected from the group consisting of RENE' 80, RENE' 77, MAR-M-509, RENE' 108, RENE' 125, B-1900, B-1900+Hf, MAR-M-246, IN-100, GTD-111, WASPALOY, Inconel 713, Inconel 738, Inconel 792, Inconel 939, and U-500.

3. The process of claim 1, wherein the step of filling is accomplished by welding.

4. The process of claim 1, wherein the filler metal has substantially the same composition as the non-castable superalloy article.

5. The process of claim 1, wherein the step of smoothing filler metal defects and removing oxide is accomplished by grinding.

6. The process of claim 1, wherein the step of applying is accomplished by coating the surface of the filler metal with the binder and then dusting the cladding powder onto the binder before the binder has dried.

7. The process of claim 1, wherein the binder contains an acrylic resin.

8. The process of claim 1, wherein the binder is a mixture of an acrylic resin and a volatile solvent therefor.

9. The process of claim 1, wherein the binder is a mixture of an acrylic resin and diethylene glycol monobutyl ether.

10. The process of claim 1, wherein the cladding powder further comprises a mixture of at least two different particle compositions, the first particle composition having substantially the same composition as the high-melting temperature superalloy article and the second composition having a lower melting temperature than the first composition and the superalloy article.

11. The process of claim 1, wherein the step of applying the mixture of the binder and the cladding powder is performed at least twice to build up a layer of the cladding powder on the surface of the filler metal.

12. The process of claim 1, wherein the step of heat treating is performed at a temperature sufficiently high that at least a portion of the cladding powder solidifies isothermally.

13. The process of claim 1, wherein the article is a component of an aircraft gas turbine engine.

14. An article prepared by the process of claim 1.

15. An article prepared by the process of claim 13.

16. A process for preparing a high-melting temperature superalloy article from a non-castable high-melting temperature superalloy that is free of unacceptably large casting defects upon solidification normally associated with the non-castable superalloy, comprising the steps of:
   casting an article from a non-castable superalloy;
   identifying a primary defect in the cast article;
   excising the primary defect and a portion of metal around the defect to create an excised volume;
   filling the excised volume with a filler metal having substantially the same composition as the high-melting temperature superalloy article;
   smoothing filler metal defects and removing oxide at the surface of the filler metal;

applying a mixture of a binder and a cladding powder to the surface of the filler metal, the cladding powder further comprised of a mixture of at least two powder particles having different compositions, the first powder particle composition having about the same composition and melting temperature as the superalloy article, and the second powder particle composition having a lower melting temperature than the first particle composition and the superalloy article, and which is capable of wetting the first alloy powder particles and the superalloy article upon melting;

heat treating the article to remove the binder, and to melt at least a portion of the powder particles and solidify the powder particles by isothermal solidification; and hot isostatically pressing the article.

17. A process for preparing a high-melting temperature superalloy article from a non-castable high-melting temperature superalloy, comprising the steps of:

casting an article from a non-castable superalloy, the article having a primary surface defect therein; and repairing the article by excising the primary defect and a region around it, filling the excised volume with a filler metal of non-castable high-melting temperature superalloy having substantially the same composition as the as the article, recognizing that there may be filler metal defects at the surface of the filled volume, smoothing any filler metal defects, sealing the surface of the filler metal with a cladding powder containing a finely-divided metal component having a lower melting temperature than the filler metal and which is capable of diffusing into the surface of the filler metal during heat treatment, heat treating the article at a temperature sufficient to melt the lower melting temperature metal component and diffuse onto the surface of the filler metal, and at least partially flowing, through capillarity, into defects open to the surface thereby eliminating surface-connected defects, and hot isostatically pressing the article, thereby substantially eliminating non-surface-connected defects.

* * * * *